United States Patent [19]

Stefan et al.

[11] 3,927,680
[45] Dec. 23, 1975

[54] MACHINE FOR PICKING HOPS
[75] Inventors: Johann Stefan, Geisenfeld;
Hermann Daum, Feucht near Nurnberg, both of Germany
[73] Assignee: Fella-Werke G.m.b.H., Nurnberg, Germany
[22] Filed: Feb. 26, 1974
[21] Appl. No.: 443,513

[30] Foreign Application Priority Data
Feb. 16, 1973 Germany.............................. 2307614

[52] U.S. Cl................................................ 130/30 D
[51] Int. Cl.².......................................... A01D 46/02
[58] Field of Search........................ 130/30 D, 30 A

[56] References Cited
UNITED STATES PATENTS

| | | | |
|---|---|---|---|
| 541,431 | 6/1895 | Easton | 130/30 D |
| 1,054,551 | 2/1913 | Horst | 130/30 D |
| 2,587,604 | 3/1952 | Dauenhauer | 130/30 D |
| 2,681,066 | 6/1954 | Dauenhauer | 130/30 D |

*Primary Examiner*—Russell R. Kinsey
*Attorney, Agent, or Firm*—Fleit & Jacobson

[57] ABSTRACT

This invention relates to a hop picking machine and more particularly to a hop picking machine which includes a device for performing a secondary picking operation.

12 Claims, 11 Drawing Figures

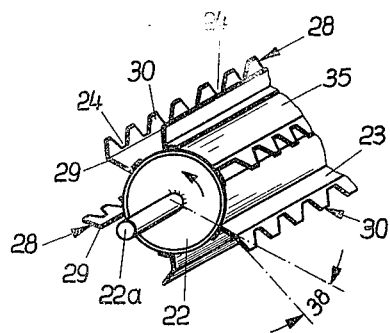
Fig. 5
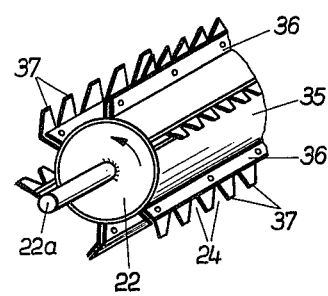
Fig. 6
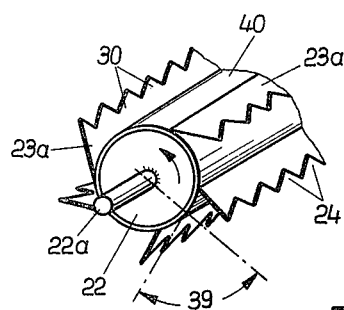
Fig. 7
Fig. 8
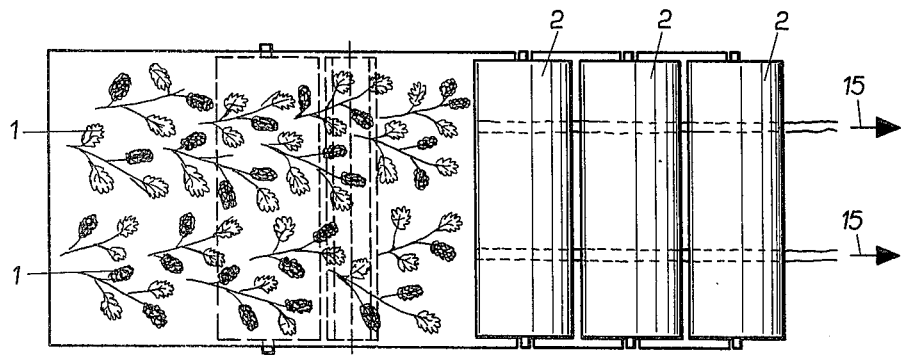

MACHINE FOR PICKING HOPS

This invention relates to a hop picking machine, and more especially to a hop picking machine in which the umbels, leaves and partly also the lateral shoots are stripped from the vine by means of picking devices, for example spring-loaded picking fingers. The lateral shoots, also called lateral twigs, here consist of a main stem with leaves and umbels.

So far, devices have been disclosed in which a coarse mesh screen belt, is mounted underneath the picking drum; this belt allows only the umbels and small leaves to pass to a conveyor belt underneath, whilst the lateral shoots are left on the screen belt and are retained by a guide roller drum and a holding-down roller for the second picking. The disadvantages of this arrangement are the large space requirement, the susceptibility to failure connected therewith and the significant material expenditure.

Moreover, a further type of machine has been disclosed in which the hop umbels are harvested from the vines by means of picking devices, are collected by a conveyor belt underneath the picking drum and are fed to a cleaning device. This machine is characterised in that after the conveyor belt a lamellar roller is fitted and after the latter a second picking device.

The disadvantage of this arrangement is that inter alia, cutting agents rotating in the screen roller can cut the umbels completely to pieces. Furthermore, lateral shoots which happen to lie longitudinally to the axis of the lamellar roller, are pressed into the slit between the lamellae by the holding-down roller so that the lateral shoots cannot be collected at all by the second picking process. A further disadvantage is the significant material expenditure.

According to the present invention there is provided apparatus for performing a secondary picking operation in a hop picking machine, such apparatus comprising separating means for separating free umbels from other hop vine material, a pair of spaced draw-in rollers positioned downstream of the separating means and arranged to provide hollows therebetween for receiving the said other hop vine material, means for rotating the pair of draw-in rollers in opposite directions, a picking drum provided with spaced apart picking fingers on its peripnery and being arranged downstream of the draw-in rollers, a curved cover provided with fixed picking fingers on one surface thereof and being spaced from the picking drum so that the fixed picking fingers and the picking fingers on the drum can co-operate to perform a picking operation and means for rotating the picking drum at a higher speed than the speed of rotation of the draw-in rollers.

Illustrative embodiments of the invention will now be described with reference to the accompanying drawings, in which:

FIG. 5 illustrates a fragmented perspective view of a draw-in roller with the comb-like strips formed on its periphery;

FIG. 6 illustrates a fragmented perspective view of a draw-in roller with the picking loops formed from sprung wire;

FIG. 7 illustrates a fragmented perspective view of a draw-in roller with strips arranged tangentially on the roller;

FIG. 8 illustrates a plan view of the hop picking machine shown in FIG. 1;

Figure 1:
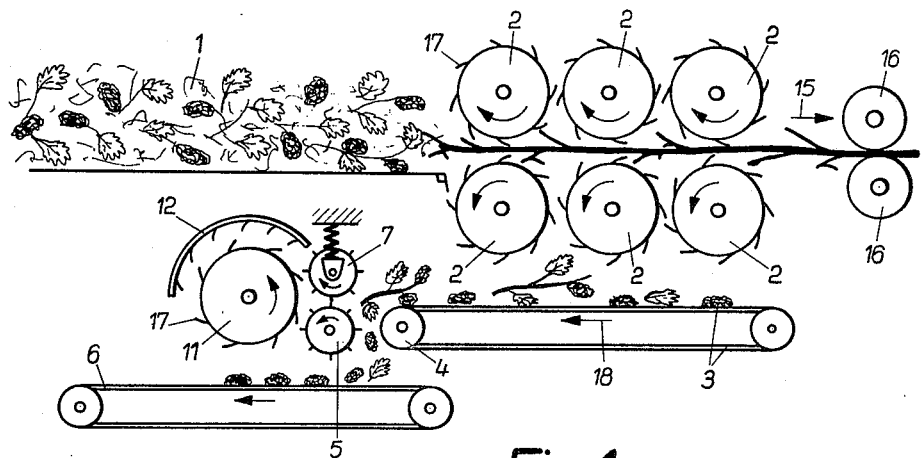
FIG. 1 illustrates a schematic cross-section of the picking and second picking elements of a hop picking machine.

In the drawings, only those components or constructional features are shown which are necessary to understand the present invention. These parts thus essentially represent the central point of the second picking stage of hops in a hop picking machine while the so-called main picking process of the hop vines is simultaneously still proceeding in the same machine. The second picking thus only refers to the lateral shoots or side branches of the vine which have been separated or torn off in the first phase of the picking.

Referring now to the drawings, there is shown a hop vine 1 being drawn between picking drums 2 in the picking direction 15 by means of draw-through rollers 16. In the course thereof, the picking fingers 17, which may be spring loaded on the picking drum 2 separate the umbels, the leaves and in part also the lateral shoots from the vine 1. All of the separated parts are conveyed in the direction of the arrow 18 by a conveyor belt 3, and the umbels and leaves fall onto a conveyor belt 6, positioned below the belt 3, through a gap which, as shown in FIG. 1, is delimited by a return roller 4 and a lower draw-in roller 5, whilst the lateral shoots are gripped by draw-in rollers 5, 7 and slowly drawn therethrough. The roller 7 is spring biased towards the roller 5.

Figure 2:
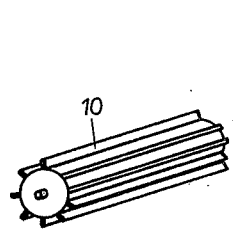
FIG. 2 illustrates a draw-in roller of the machine in perspective view.
Figure 9:
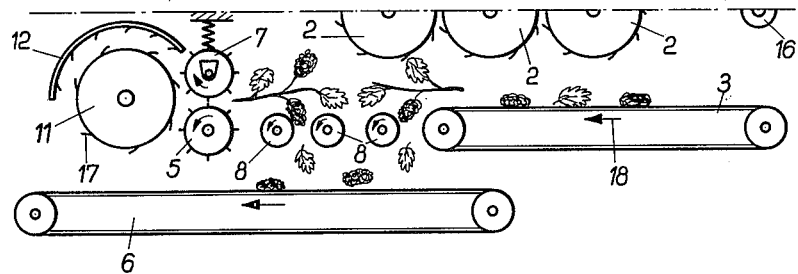
FIG. 9 illustrates a schematic cross-section, similar to FIG. 1, with a modified arrangement of sorting rollers.
Figure 10:
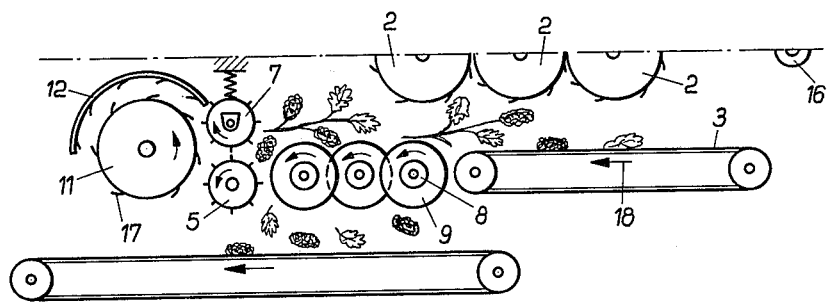
FIG. 10 illustrates a schematic cross-section similar to FIG. 9 but with a further arrangement of sorting rollers.
Figure 11:
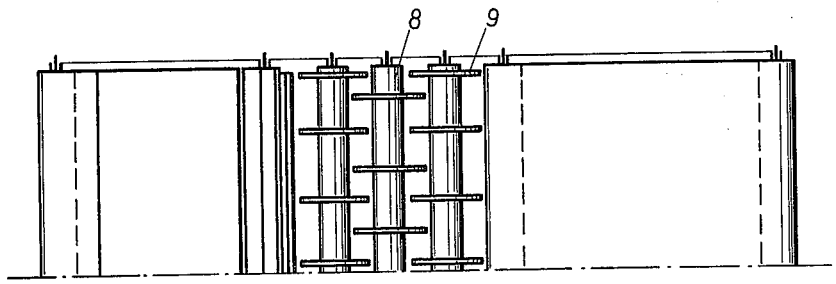
FIG. 11 illustrates a plan view of the arrangement shown in FIG. 10.

In order to avoid blockages in or before the gap, rollers 8 (FIG. 9) are provided. These rollers can if required be fitted with discs 9 (FIGS. 10, 11). The draw-in rollers 5, 6 are fitted with radially protruding strips 10 (see FIG. 2) so that between the two draw-in rollers 5 and 6, hollow spaces are continuously formed into which the umbels still hanging on the lateral shoots can fit without being damaged.

As a consequence of the different in the speeds of revolution between the draw-in rollers 5, 7 on the one hand and that of a second picking drum 11 provided with picking fingers 17 on the other, the umbels are completely picked off the lateral shoots, An approximately semi-circular cover 12, with fixed picking fingers is arranged in an arc around the second picking drum 11 to allow complete separation of the umbels from the lateral shoots.

Figure 3:
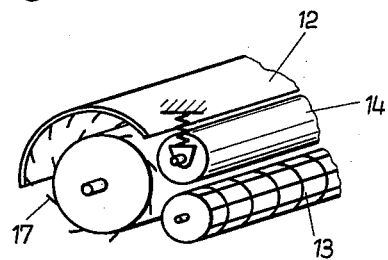
FIG. 3 illustrates a further embodiment of a second picking device with a screen roller and a counter roller arranged on the draw-in rollers.

A modified form of the draw-in rollers is shown in FIG. 3, where the lateral shoots are gripped by a meshed screen roller 13 and a smooth spring biased roller 14 positioned above the latter. The umbels of the lateral shoots can turn into the openings of the screen roller 13 while the stems are retained by the pressure exerted by the smooth roller 14 and the umbels are completely picked off by the picking fingers 17 of the second picking drum 11.

Other embodiments of the second picking drum are shown in FIGS. 4 to 7 as will be described.

Figure 4:
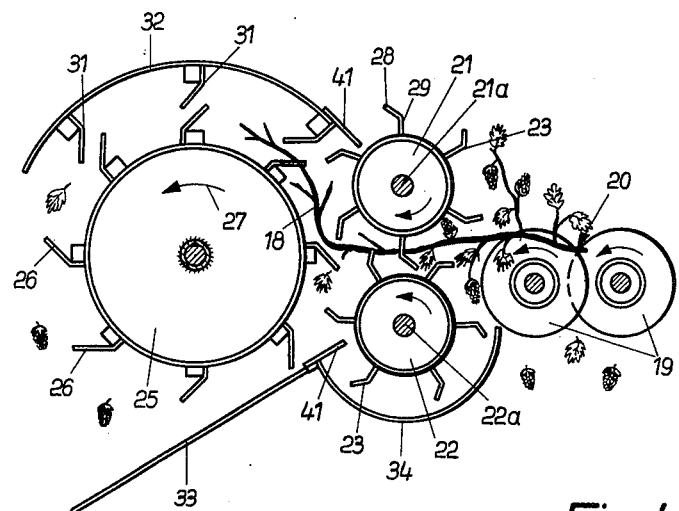
FIG. 4 illustrates a second picking device consisting of several rollers and a picking drum, in slightly enlarged side view.

The picked material, caught by the picking elements which are not shown and separated from the vines, in part consists of single umbels, leaves, stems and lateral shoots 18, and proceeds as shown in FIG. 4 into the feed zone of a presorting device 20 which comprises disc rollers 19 in which separation is achieved in such a way that umbels, leaves and smaller stem residues are already segregated while the lateral shoots 18 and the longer stems are gripped by draw-in rollers 21, 22, which rotate around axes 21a and 22a, and which are arranged downstream of the sorting device 20. Their rotation takes place in opposite directions in order to produce a reliable draw-in effect.

The lateral shoots 18 and longer stems are for practical purposes retained by comb-shaped strips 23 arranged on the periphery of the rollers 21, 22, in such a way, that the stems of the lateral shoots 18 insert themselves into the intervening recesses 24 (FIG. 5) and temporarily anchor there, while the lateral shoots 18, in a second picking drum 25 which rotates much faster in the direction of arrow 27, are gripped by picking fingers 26, drawn through, picked off and in turn ejected. This process can only take place within the range of the speed at which the lateral shoots 18 or the like are released from the zone of the slower-running draw-in rollers 21, 22.

The danger that the lateral shoots 18 or the like will be drawn through untreated between the draw-in rollers 21, 22 is extremely remote because, as already mentioned, the stems insert themselves into the recesses 24 so that the lateral twigs and the like protruding from the stems are prevented from passing straight through. The strips 23 also act against this tendency. The free edges 28 of the strips 23 are comb-shaped, that is to say they are interrupted by a series of recesses 24, and starting at the point 29, are bent from the radial direction to an oblique direction which points in a direction opposite to that of rotation.

To prevent damage to the umbels at the draw-in rollers 21, 22 the latter are, on the one hand, spaced so that a free gap remains between the strips 23 of the counterrotating draw-in rollers 21, 22 whilst the strips 23 are also arranged to intermesh with gaps in opposite positions that is to say with regard to rotation. Moreover, the comb-like recesses 24 in the strips 23 are triangular in shape, that is to say an incision open at the top (intervening recess 24) alternates with a tooth 30, of approximately pointed contour, in the next position.

The picking fingers 26 on the second picking drum 25 have rigid counter-picking elements 31 which are fixed to a cover 32 which forms a semi-circular dome at a distance around the second picking drum 25. The harvested material is conveyed away on an inclined chute 33 fixed underneath the second picking drum 25. The chute is rigidly connected with a domed sheet metal cover 34.

FIG. 6 shows a further arrangement of the strips on the draw-in rollers. Instead of the comb-like formation of the strips, clamping strips 36 are arranged on cylinders 35 of the draw-in rollers 21, 22 for securely holding picking loops 37 made of pronged spring wire. The shape of the picking loops 37 is approximately congruent with the comb-shaped strips 24 shown in FIG. 5, but the looped form brings a further advantage in the picking process.

Finally, in FIG. 5, the angled position 38 is shown which fold 29 or the bending approximately assumes in relation to the radial arrangement of the strip 23. In the embodiment of FIG. 7, however, a straight strip 23a is welded to a cylinder 40 of the draw-in roller 22 at an angle 39. This strip 23a is fixed tangentially with regard to the roller body or the draw-in roller 22.

A part of the umbels harvested by the second picking device could fall through or be ejected from the slit-like openings which are formed by the space between the strips; to prevent this, elastic flaps or scrapers 41 are provided (See FIG. 4).

We claim:

1. Apparatus for performing a secondary picking operation in a hop picking machine, such apparatus comprising separating means, said separating means being adapted to free umbels from other hop vine material, a pair of spaced draw-in rollers, said rollers being positioned downstream of the separating means, means providing hollows between said pair of rollers, for receiving the said other hop vine material, means for rotating the pair of draw-in rollers in opposite directions, a picking drum, said picking drum being provided with spaced apart picking fingers on its periphery and being arranged downstream of the draw-in rollers, a curved cover, said cover having a surface, fixed picking fingers, said fixed picking fingers being positioned on said surface of said cover, and being spaced from the said picking drum so that the fixed picking fingers and the picking fingers on the drum can co-operate to perform a picking operation and means for rotating the picking drum at a higher speed than the speed of rotation of the draw-in rollers.

2. Apparatus according to claim 1, which includes a plurality of spaced strips arranged about the periphery of each said roller, said strips co-operating with corresponding strips on the other roller to provide said hollow defining means.

3. Apparatus according to claim 2, in which said strips extend radially.

4. Apparatus according to claim 2, in which the strips are arranged on said rollers in the form of a comb.

5. Apparatus according to claim 2, in which each strip has a bent portion in the region of its free end which extends in a direction opposite to the direction of rotation of its associated roller.

6. Apparatus according to claim 2, in which the strips extend tangentially to the outer surface of their associated roller in a direction opposite to the direction of rotation of the roller.

7. Apparatus according to claim 2, in which the strips are formed from looped sprung wire.

8. Apparatus according to claim 7, in which the loops extend in a direction opposite to the direction of rotation of their associated roller.

9. Apparatus according to claim 6, in which the loops are clamped onto the outer surface of the rollers by means of clamping strips.

10. Apparatus according to claim 1, in which one of said draw-in rollers has its outer surface formed by a meshed screen and the other roller has a smooth outer surface.

11. Apparatus according to claim 1 in which the separating means comprises at least one roller arranged parallel to the draw-in rollers.

12. Apparatus according to claim 11, in which the said at least one roller is provided with disc elements on its outer surface.

* * * * *